United States Patent
Yokoyama et al.

(10) Patent No.: US 9,956,673 B2
(45) Date of Patent: May 1, 2018

(54) TIGHTENING TOOL

(71) Applicant: TOHNICHI MFG. CO., LTD., Ota-ku, Tokyo (JP)

(72) Inventors: Tetsuya Yokoyama, Tokyo (JP); Yasuhiro Yamamoto, Tokyo (JP); Tomohiro Ogata, Tokyo (JP); Satoshi Takaku, Tokyo (JP)

(73) Assignee: TOHNICHI MFG. CO., LTD., Tokyo (JP)

( * ) Notice: Subject to any disclaimer, the term of this patent is extended or adjusted under 35 U.S.C. 154(b) by 273 days.

(21) Appl. No.: 14/889,356

(22) PCT Filed: Jan. 21, 2015

(86) PCT No.: PCT/JP2015/000260
§ 371 (c)(1),
(2) Date: Nov. 5, 2015

(87) PCT Pub. No.: WO2016/027385
PCT Pub. Date: Feb. 25, 2016

(65) Prior Publication Data
US 2016/0279770 A1    Sep. 29, 2016

(30) Foreign Application Priority Data

Aug. 20, 2014 (JP) .................................. 2014-167731
Dec. 18, 2014 (JP) .................................. 2014-256181

(51) Int. Cl.
*B25B 23/142* (2006.01)
*H02J 7/35* (2006.01)

(52) U.S. Cl.
CPC .......... *B25B 23/1425* (2013.01); *H02J 7/355* (2013.01)

(58) Field of Classification Search
CPC ....... B25B 23/1425; B25B 23/14; H02J 7/355
See application file for complete search history.

(56) References Cited

U.S. PATENT DOCUMENTS

| 4,805,404 A | 2/1989 | Dupin |
| 6,311,786 B1 | 11/2001 | Giardino et al. |

(Continued)

FOREIGN PATENT DOCUMENTS

| EP | 0 255 433 A | 2/1988 |
| EP | 1 392 474 | 3/2004 |

(Continued)

OTHER PUBLICATIONS

Taiwan Patent Office, "Office Action for Taiwanese Patent Application No. 104122540," dated Jul. 7, 2016.

(Continued)

*Primary Examiner* — David B Thomas
(74) *Attorney, Agent, or Firm* — Manabu Kanesaka

(57) ABSTRACT

A tightening tool such as a torque wrench is provided in which electric power can be fed to an electronic circuit with eliminating the need for a battery and achieving daily maintenance-free. In the tightening tool, when a tightening torque has reached a set torque value and a torque limiter is actuated, an electronic circuit unit that has obtained a detection signal outputted from a torque limiter actuation detection unit outputs a tightening completion signal. The tightening tool has a power generation unit for feeding electric power to the electronic circuit unit at least during the actuation of the torque limiter. The power generation unit performs photovoltaic power generation, electromagnetic induction power generation, power generation by conversion from mechanical energy into electrical energy, or temperature difference power generation.

19 Claims, 14 Drawing Sheets

(56) References Cited

U.S. PATENT DOCUMENTS

| | | | |
|---|---|---|---|
| 6,581,696 B2* | 6/2003 | Giardino | B25B 23/1405 173/1 |
| 6,848,516 B2* | 2/2005 | Giardino | B25B 23/1405 173/176 |
| 6,892,826 B2* | 5/2005 | Giardino | B25B 23/1405 173/1 |
| 8,485,075 B1 | 7/2013 | Gauthier et al. | |
| 8,714,058 B2 | 5/2014 | Gauthier et al. | |
| 9,126,317 B2* | 9/2015 | Lawton | B25B 21/00 |
| 9,242,356 B2* | 1/2016 | King | B25B 23/1422 |
| 9,308,632 B2* | 4/2016 | Junkers | B25B 21/00 |
| 9,395,257 B2* | 7/2016 | Li | G01L 5/24 |
| 9,669,527 B2* | 6/2017 | Ho | B25B 23/1427 |
| 9,700,970 B2* | 7/2017 | Lee | B23P 19/04 |
| 9,740,800 B2* | 8/2017 | Suryanarayan | G06F 17/50 |
| 2002/0020538 A1* | 2/2002 | Giardino | B25B 23/1405 173/176 |
| 2002/0105794 A1 | 8/2002 | Hanscom et al. | |
| 2002/0105796 A1 | 8/2002 | Naghi et al. | |
| 2002/0105797 A1 | 8/2002 | Navid et al. | |
| 2011/0192261 A1 | 8/2011 | Hsieh | |
| 2011/0247684 A1* | 10/2011 | Huang | H01L 31/048 136/256 |
| 2012/0234569 A1 | 9/2012 | Lawton et al. | |
| 2013/0042730 A1 | 2/2013 | Griffin | |
| 2013/0112049 A1* | 5/2013 | Lawton | B25B 23/1425 81/429 |
| 2014/0238714 A1* | 8/2014 | Lawton | B25B 23/1425 173/1 |
| 2014/0336810 A1* | 11/2014 | Li | B25B 23/1425 700/103 |
| 2014/0336955 A1* | 11/2014 | Li | G01L 5/24 702/41 |

FOREIGN PATENT DOCUMENTS

| | | |
|---|---|---|
| JP | S60-25662 A | 2/1985 |
| JP | S63-221981 A | 9/1988 |
| JP | H09-168981 A | 6/1997 |
| JP | H11-221779 A | 8/1999 |
| JP | 2004-528188 A | 9/2004 |
| JP | 2007-283455 A | 4/2006 |
| JP | 2008-203264 A | 2/2008 |
| JP | 2008-307670 A | 12/2008 |
| TW | M317906 U | 9/2007 |
| TW | M381484 U | 6/2010 |
| TW | M383469 U | 7/2010 |
| TW | M384090 U | 7/2010 |
| TW | I369279 B | 8/2012 |
| TW | M443598 U | 12/2012 |
| TW | M444251 U | 1/2013 |
| TW | 201315576 A | 4/2013 |
| TW | 201341128 A | 10/2013 |
| WO | 02/098612 A1 | 12/2002 |

OTHER PUBLICATIONS

PCT, "International Search Report for International Application No. PCT/JP2015/000260 (PCT/ISA/210)".

* cited by examiner (A)

(B)

(C)

(A)

(B)

(C)

(A)

(B)

(C)

(A)

(B)

TIGHTENING TOOL

RELATED APPLICATIONS

The present application is National Phase of International Application No. PCT/JP2015/000260 filed Jan. 21, 2015, and claims priority from Japanese Applications No. 2014-167731, filed Aug. 20, 2014; and No. 2014-256181, filed Dec. 18, 2014, the disclosure of which is hereby incorporated by reference herein in its entirety.

TECHNICAL FIELD

The present invention relates to a tightening tool such as a torque wrench equipped with a power generation device.

BACKGROUND ART

Conventionally, there are provided tightening tools such as torque wrenches equipped with an electronic circuit, by which in tightening a member to be tightened such as a bolt, when a tightening torque has reached a set torque value, data of a tightening torque value and the like is wirelessly transmitted to indicate the end of tightening of the member to be tightened (Patent Literature 1).

Such tightening tools are provided with a power supply battery (battery) in an exchangeable manner to supply electric power to an electronic circuit including a wireless transmitter.

When the battery is employed as a power source of the tightening tool, if the use of the tightening tool is started with a low remaining battery level, the use might be continued without being noticed of battery exhaustion during the use. In this case, no tightening data is transmitted.

The battery exhaustion or the low remaining battery level requires an exchange operation of batteries, or a connection operation of a charging cable for recharging. Such operations are performed as part of daily maintenance, for example, in machine assembly plants and the like.

On the other hand, the tightening tools of a battery exchange type need a battery contact and hence easily have a contact failure, and specifically the torque wrenches tend to have a defective battery contact or the like due to a large impact applied thereon during use. The tightening tools having a rechargeable battery as a power supply cannot avoid a break of a charging jack and a break of the charging cable.

Thus, daily maintenance management is important for the tightening tools with the battery as the power supply part.

On the other hand, there are provided many products of tools such as torque wrenches equipped with an electronic circuit. A dry cell is generally used as a power supply for such an electronic circuit, but the products using a solar cell are proposed (Patent Literature 2).

In attaching the solar cell to the tool (hereinafter called tool with the solar cell), for example, a torque wrench, it should be considered that the solar cell does not interfere with operation of the tool such as a torque wrench, and a light receiving surface can receive as much light as possible, and the like.

The tool with the solar cell is often put on a workbench or the like during standby in a tightening operation, for example. An operator puts the tool on the workbench with confirmation that the light receiving surface of the solar cell faces toward room light, so that electric power generated by the solar cell that has received light of, for example, a ceiling light can be accumulated in a storage battery for that duration.

However, when the operator puts the tool with the solar cell in a hurry without being sure whether or not the light receiving surface of the solar cell faces upward, the tool may be put such that the light receiving surface of the solar cell faces to the workbench and no light arrives at the light receiving surface of the solar cell.

CITATION LIST

Patent Literature

Patent Literature 1: Japanese Patent Application Laid-Open No. 2008-307670
Patent Literature 2: Japanese Patent Application Laid-Open No. 2008-203264

SUMMARY OF INVENTION

Technical Problem

A first problem to be solved by the present invention is to provide a tightening tool such as a torque wrench that can feed electric power to an electronic circuit with eliminating the need for a battery and achieving daily maintenance-free.

A second problem to be solved by the present invention is to provide a tightening tool with a solar cell in which when the tool with the solar cell is put on a workbench or the like, a light receiving surface of the solar cell changes to a lateral position and stops.

Solution to Problem (1) A first structure of a tightening tool to solve the first problem of the present invention, wherein when a tightening torque has reached a set torque value and a torque limiter is actuated, an electronic circuit unit that has obtained a detection signal outputted from a torque limiter actuation detection unit outputs a tightening completion signal, is characterized by including a power generation unit for feeding electric power to the electronic circuit unit at least during the actuation of the torque limiter.

(2) In the above-described first structure, the power generation unit is a photoelectric conversion element for converting light energy into electrical energy.

(3) In the above-described first structure, the power generation unit is of an electromagnetic induction type in which switching magnetic poles of the N pole and the S pole to be applied to a pair of poles of a yoke by pole switching means generates an electromotive force from an induction coil wound on the yoke, and the switching of the pole switching means is driven with the use of a mechanical operation during the actuation of the torque limiter.

(4) In the above-described first structure, the power generation unit is a mechanical-electrical energy conversion element for converting mechanical energy into electrical energy, and an impact is applied to the mechanical-electrical energy conversion element with the use of a mechanical operation during the actuation of the torque limiter.

(5) In the above-described first structure, the power generation unit is a thermoelectric conversion element for converting a temperature difference into electrical energy, provided in a grip portion on which an operator takes a grip in a tightening operation.

(6) In the above-described third or fourth structure, the mechanical operation during the actuation of the torque limiter is an operation between a moving operation of a first member on which an operator takes a grip along a tightening direction and a second member integrally connected to a member to be tightened.

(7) In any of the above-described structure, an electric storage unit is provided for accumulating surplus electricity generated in the power generation unit.

(8) In any of the above-described structure, the tightening tool is a torque wrench or a torque driver.

(9) A first structure of a tightening tool to solve the second problem of the present invention is a tool with a solar cell that includes a solar cell disposed on a surface of the tool, and a cover that extends in a longitudinal direction of a body of the tool and covers the solar cell in which a transverse direction orthogonal to the longitudinal direction is designated as a width direction, is characterized in that the cover is formed into a convex arc-shaped roof such that atop surface on the side of alight receiving surface of the solar cell faces outward, and has oblique surfaces at respective ends in the width direction.

(10) A second structure of a tightening tool to solve the second problem of the present invention is a tool with a solar cell that includes a solar cell disposed on a surface of the tool, and stop inhibiting members that extend in a longitudinal direction of a body of the tool and are disposed at respective ends of the solar cell in the longitudinal direction, in which a transverse direction orthogonal to the longitudinal direction is designated as a width direction, and protrudes upward from a light receiving surface of the solar cell, is characterized in that the stop inhibiting member is formed into a convex arc shape such that a top end on the side of the light receiving surface of the solar cell faces outward, and has oblique surfaces at respective ends in the width direction.

(11) A third structure of a tightening tool to solve the second problem of the present invention is a tool with a solar cell that includes a solar cell disposed on a surface of the tool, and a stop inhibiting member that extends in a longitudinal direction of a body of the tool and is disposed astride the solar cell, in which a transverse direction orthogonal to the longitudinal direction is designated as a width direction, and protrudes upward from a light receiving surface of the solar cell, is characterized in that the stop inhibiting member is formed into a convex arc shape such that a top end on the side of the light receiving surface of the solar cell faces outward, and has oblique surfaces at respective ends in the width direction.

(12) A fourth structure of a tightening tool to solve the second problem of the present invention is characterized in that in the above-described first structure, a center line of the cover in the width direction and a center line of the tool are misaligned in the width direction.

(13) A fifth structure of a tightening tool to solve the second problem of the present invention is characterized in that in the above-described second or third structure, a center line of the stop inhibiting member in the width direction and a center line of the tool are misaligned in the width direction.

(14) A sixth structure of a tightening tool to solve the second problem of the present invention is characterized in that in any of the above-described structures, the solar cell protrudes outward from one end in the width direction, relative to a tool disposition portion in which the solar cell is disposed.

(15) A seventh structure of a tightening tool to solve the second problem of the present invention is characterized in that in any of the above-described structures, the tool is a torque wrench, and the solar cell is disposed in an opposite side to a direction in which a square shaft provided in a head protrudes.

Advantageous Effects of Invention

According to the invention of claim 1, it becomes unnecessary to feed the electric power from a battery or an external power supply, and daily maintenance management of the tightening tool such as a torque wrench and a torque driver is significantly reduced. Specifically, a contact failure of the battery, a break of a charging jack, and a break of a charging cable are eliminated.

Also, by eliminating the need for the battery, it is possible to reduce the size of a case for an electronic circuit in which the battery is to be contained conventionally, and make the tightening tool such as the torque wrench compact in size.

In the invention of claim 2, electric power can be fed even with illumination light in a plant.

In the invention of claims 3 and 4, the power generation unit can be driven with the use of the operation of the torque limiter. Thus, electric power is generated and fed to the electronic circuit at the time of completion of tightening, so that the tightening completion signal is outputted without any problem.

According to the invention of claim 5, it is possible to generate electric power with the effective use of thermal energy of the operator.

According to the invention of claim 6, a toggle mechanism or the like can be used.

According to the invention of claim 7, the electronic circuit unit can be driven by the electric power of the electric storage unit, in case of emergency i.e. trouble with the power generation unit.

According to the invention of claims 9, 10, and 11, when a roof surface of the cover comes into contact with a placement surface, the tool such as the torque wrench topples and stops in a lateral stable position. Thus, light can be incident upon the light receiving surface of the solar cell, and thereby the solar cell generates electric power.

According to the invention of claims 12 and 13, since the misalignment between the center lines causes imbalance of the tool such as the torque wrench, the tool such as the torque wrench easily topples and the toppling characteristic of the tool such as the torque wrench is improved.

According to the invention of claim 14, since imbalance of the tool such as the torque wrench occurs, the tool such as the torque wrench easily topples and the toppling characteristic of the tool such as the torque wrench is improved.

DESCRIPTION OF EMBODIMENTS

Figure 1:
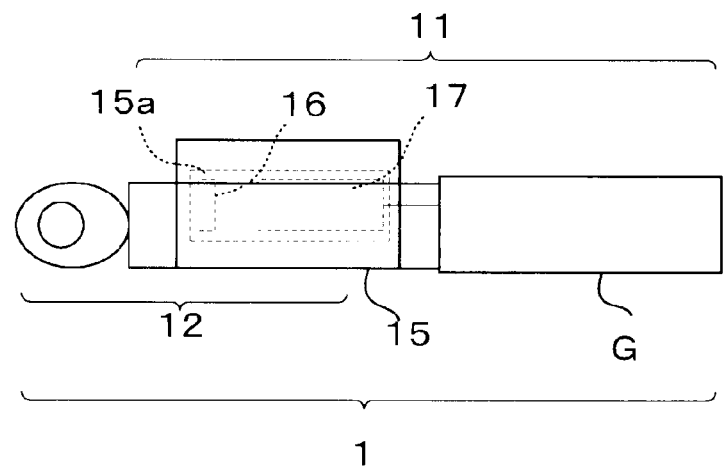
FIG. 1 (A) is a schematic top plan view of a torque wrench illustrating a first embodiment of the present invention, (B) is a front view of (A), and (C) is a schematic view of a torque limiter.
Figure 1:
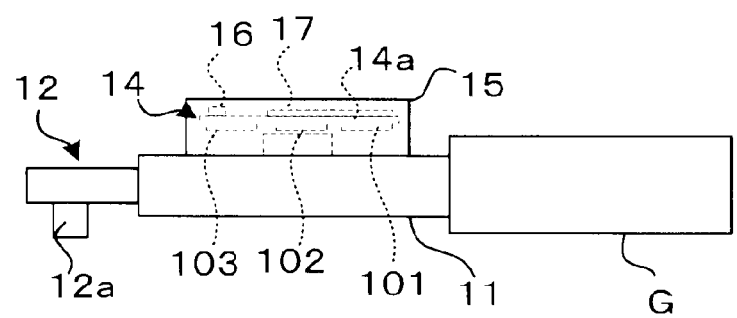
Figure 1:
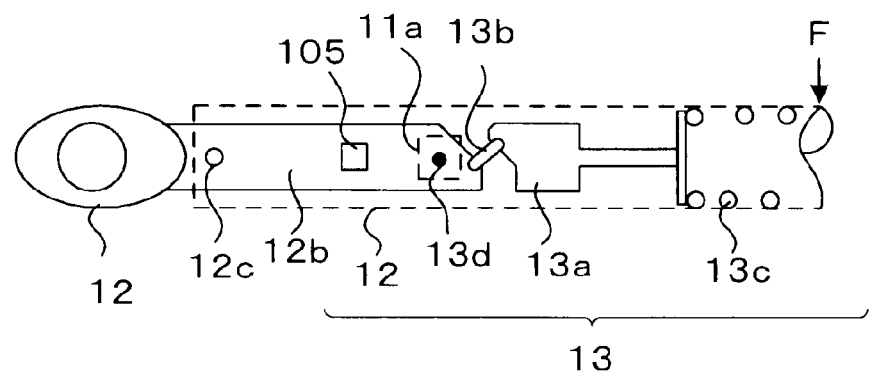

Hereinafter, the present invention will be described on the basis of embodiments illustrated in the drawings.

First Embodiment

Figure 2:
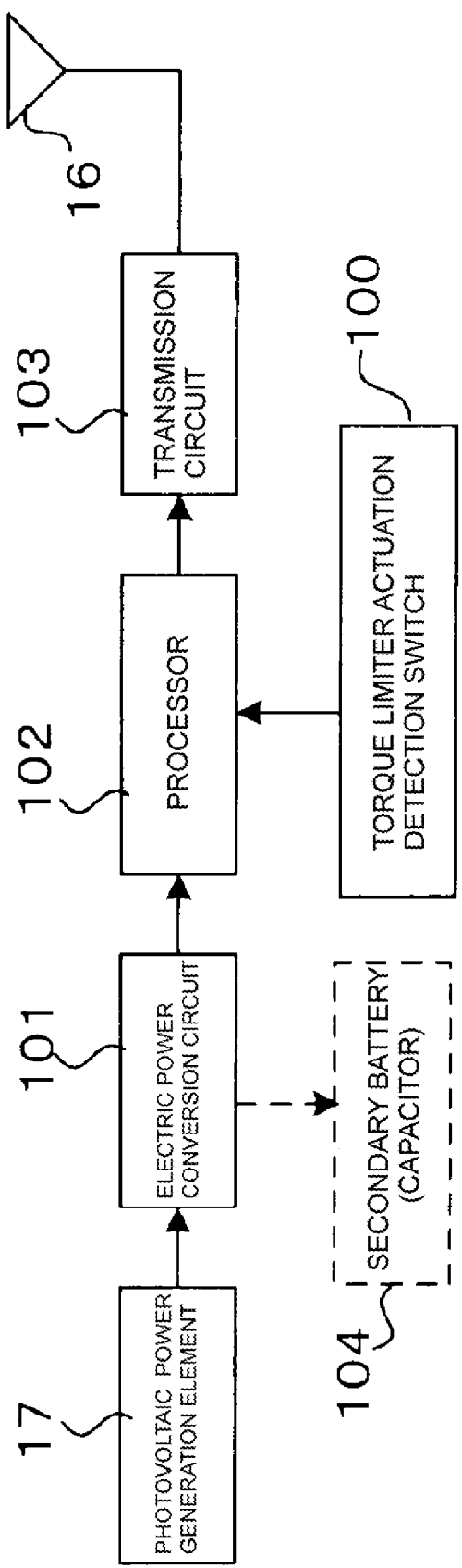
FIG. 2 is a circuit block diagram of a power generation unit and an electronic circuit of the torque wrench illustrated in FIG. 1.

FIG. 1 shows a first embodiment in which a tightening tool according to the present invention is applied to a torque wrench, and FIG. 1 (A) is a top plan view, FIG. 1 (B) is a front view, FIG. 1 (C) is a schematic view of a torque limiter. FIG. 2 is a circuit block diagram of a power generation unit and an electronic circuit of the torque wrench illustrated in FIG. 1.

A torque wrench 1 has a tubular handle unit 11, a head unit 12 having a square shaft 12a, a torque limiter 13 of a toggle mechanism, an electronic circuit 14, a circuit board case 15 containing the electronic circuit 14, a communication antenna 16, and a photovoltaic power generation unit 17. The handle unit 11 has a grip G at its rear end, and an operator performs a tightening operation with holding a predetermined position of the grip G.

In the torque wrench 1, a lever 12b of the head unit (a second member) 12 is inserted into a front end portion of the handle unit (a first member) 11, to attach the head unit 12 to the handle unit 11 through a spindle 12c in a swingable manner. A not-shown socket is attached onto the square shaft 12a of the head unit 12, and the socket is fitted onto a member to be tightened such as a bolt.

A circuit board 14a of the electronic circuit 14 is fixed to an outer peripheral surface of the handle unit 11. In the circuit board 14a, a torque limiter actuation detection switch 100 is mounted. Also, an electric power converter 101 for converting electric power generated by the photovoltaic power generation unit 17 to a predetermined voltage, a processor 102 such as a CPU for controlling the entire electronic circuit 14 on the basis of the electric power converted by the electric power converter 101, and a communication unit 103 are mounted on the circuit board 14a, and the communication antenna 16 is connected to the communication unit 102. Note that, surplus electricity generated in the electric power conversion by the electric power converter 101 may be charged in an electric storage unit 104 such as a secondary battery or a capacitor for use as an emergency power supply in case of a break in the photovoltaic power generation unit 17.

Upon obtaining an actuation detection signal from the torque limiter actuation detection switch 100, the processor 101 outputs a tightening completion signal to the communication unit 103. The communication unit 103 wirelessly transmits the tightening completion signal to a not-shown management device through the communication antenna 16.

The photovoltaic power generation unit 17 constitutes a drive power supply of the electronic circuit 14. The photovoltaic power generation unit is configured such that a photovoltaic power generation element such as a solar cell for converting light energy into electrical energy is attached on, for example, a top surface of the circuit board case 15. The photovoltaic power generation element has the property of being able to generate electric power even with an interior light, and by way of example, is used as a power supply for a clock.

The torque limiter 13 has the lever 12b, a toggle rest 13a, a toggle 13b coupled to the toggle rest 13a, a torque value adjustment spring 13c that biases the toggle rest 13a toward the side of the head unit 12, and a not-shown torque value adjustment member that is in contact with a rear end of the torque value adjustment spring 13c and is movable in an axial direction.

FIG. 1 (c) illustrates a non-operating state of the torque limiter 13, and applying power to the direction of an arrow F with holding the handle unit 11 transmits a tightening force from the handle unit 11 to the toggle rest 13a, the toggle 13b, the lever 12b, and the square shaft 12a, so that the member to be tightened such as the bolt is tightened. When a tightening torque has reached a set torque value, the head unit 12 does not turn, and the handle unit 11 starts turning about the spindle 12c. Accordingly, a component of force against a bias force of the torque value adjustment spring 13c acts on the toggle 13b along the axial direction of the handle 11 and the toggle rest 13a moves backward by a toggle operation. At this time, the rigid coupling between the toggle rest 13a and the lever 12b is released, and an inner peripheral surface of the handle unit 11 collides with the lever 12b. By this sequential operation, a user recognizes that the member to be tightened is tightened with the set torque value.

The handle unit 11 is formed with an elongated hole 11a, and a toggle actuation detection pin 13d implanted in the lever 12b penetrates the elongated hole 11a to enable actuation of the torque limiter actuation detection switch 100 provided in the circuit board 14a.

According to this embodiment, the photovoltaic power generation unit 17 generates electric power upon receiving illumination light indoors such as a plant. Thus, while the tightening torque of the member to be tightened becomes the set torque and the torque limiter actuation detection switch 100 is actuated, the electric power is fed to the electronic circuit 14. Therefore, the electronic circuit 14 can transmit the tightening completion signal.

In this embodiment, the tightening completion signal is outputted to the processor 102 by detecting the actuation of the torque limiter 13 of mechanical structure, including the torque limiter actuation detection switch 100. However, according to the present invention, the detection of the tightening completion signal is not limited to such mechanical structure. For example, in a structure in which a distortion gage 105 is glued onto the lever 12b to be capable of measuring a tightening torque value, an output specific to the attainment of the set torque value may be detected and used as the tightening completion signal. Also, an angular velocity sensor may be mounted on the circuit board 14a, and a turning operation specific to the handle unit 11 that occurs in the actuation of the torque limiter 13 may be detected by the angular velocity sensor and used as the tightening completion signal.

Second Embodiment

Figure 3:
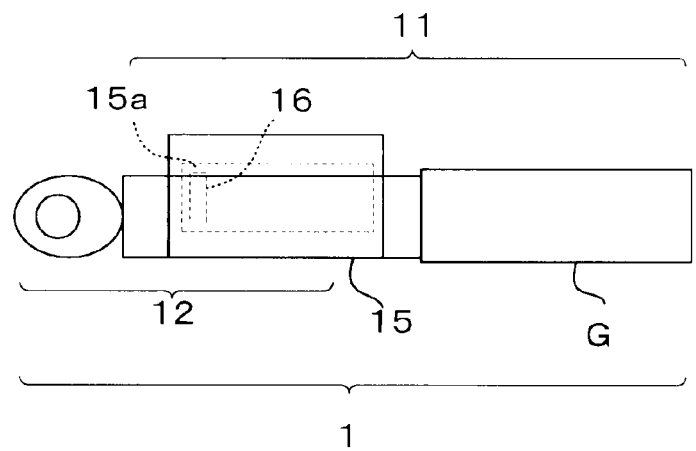
FIG. 3 (A) is a schematic top plan view of a torque wrench illustrating a second embodiment of the present invention, (B) is a front view of (A), and (C) is a schematic view of a torque limiter.
Figure 3:
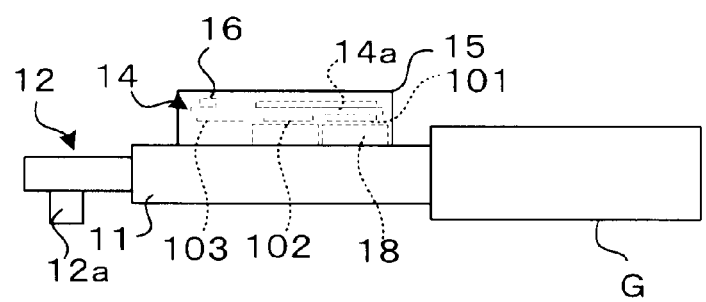
Figure 3:
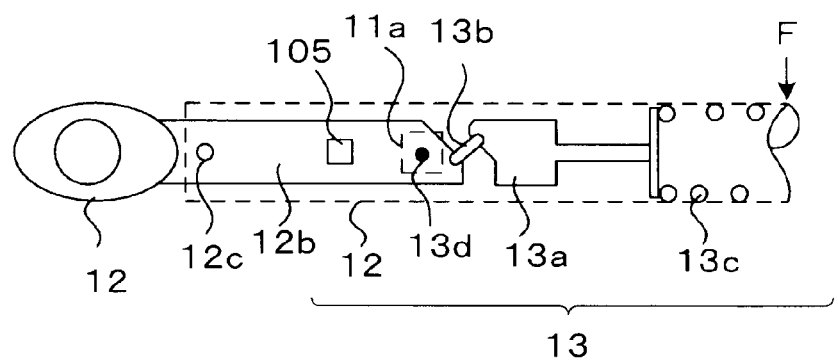
Figure 4:
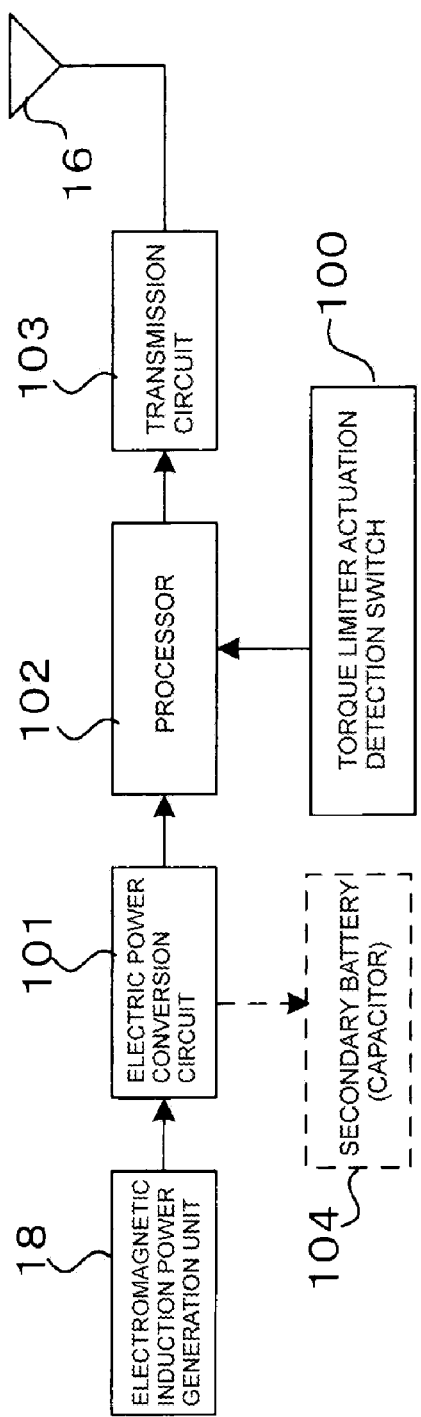
FIG. 4 is a circuit block diagram of a power generation unit and an electronic circuit of the torque wrench illustrated in FIG. 3.
Figure 5:
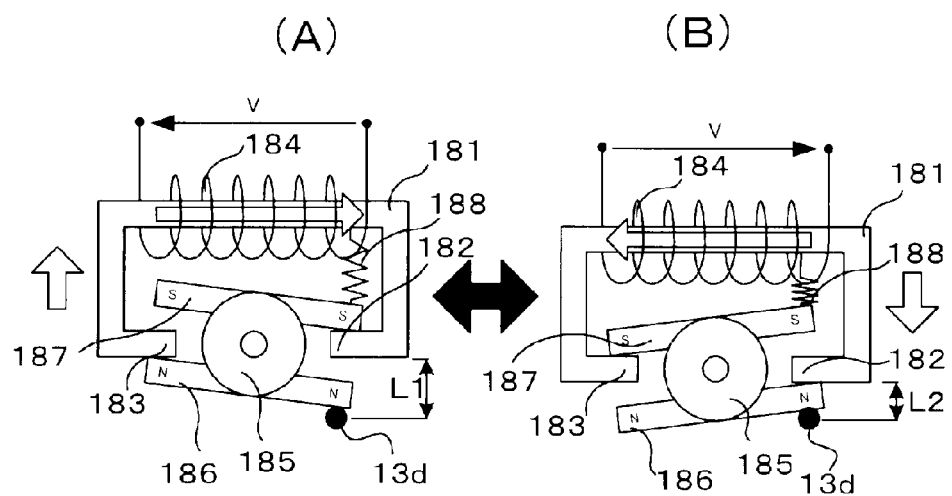
FIG. 5 is a drawing that explains principles of power generation by electromagnetic induction power generation.

FIGS. 3, 4, and 5 illustrate a second embodiment.

FIG. 3 shows the second embodiment in which the tightening tool according to the present invention is applied to a torque wrench, and FIG. 3 (A) is a top plan view, FIG. 3 (B) is a front view, FIG. 3 (C) is a schematic view of the torque limiter. FIG. 4 is a circuit block diagram of the power generation unit and the electronic circuit of the torque wrench illustrated in FIG. 3, and FIG. 5 is a drawing that explains the principles of power generation by an electromagnetic induction power generation unit.

The second embodiment is difference from the first embodiment in terms of providing an electromagnetic induction power generation unit 18 as the power generation unit. Note that, in FIGS. 3 (A) to 3 (C) and FIG. 4, the same reference numerals as those of FIGS. 1 (A) to 1 (C) and 2 are assigned to the same components and the description thereof will be omitted.

The electromagnetic induction power generation unit 18 is attached on the circuit board 14a fixed to the handle unit 11. The toggle actuation detection pin 13d provided to the lever 12b and the handle unit 11 move relatively during the actuation of the torque limiter 13.

In this embodiment, by the relative movement of the toggle actuation detection pin 13d and the circuit board 14a during the actuation of the torque limiter 13, the electromagnetic induction power generation unit 18 generates electric power.

As illustrated in FIG. 5, the electromagnetic induction power generation unit 18 has a yoke 181, an induction coil 184, a rotor 185, a first permanent magnetic plate 186, and a second permanent magnetic plate 187. The yoke 181 is secured to a not-shown fixed member, and the induction coil 184 is wound therearound. The fixed member supports the rotor 185 in a rotatable manner, and the first permanent magnetic plate 186 and the second permanent magnetic plate 187 are fixed to the rotor 185 so as to be opposite to each other.

Both ends of the first permanent magnetic plate 186 are polarized to the N pole. Both ends of the second permanent magnetic plate 187 are polarized to the S pole.

The first permanent magnetic plate 186 and the second permanent magnetic plate 187 are each disposed astride a first magnetic pole part 182 and a second magnetic pole part 183, which are opposite to each other, of the yoke 181. In this embodiment, the second permanent magnetic plate 187 is biased by a spring 188, and the rotor 185 is biased by a spring in a clockwise direction. The toggle actuation detection pin 13d is in contact with the first permanent magnetic plate 187.

FIG. 5 (A) illustrates a non-operating state of the torque limiter 13, in which the S pole of the second permanent magnetic plate 187 is in contact with the first magnetic pole part 182, while the N pole of the first permanent magnetic plate 186 is in contact with the second magnetic pole part 183. At this time, L1 represents the distance between the toggle actuation detection pin 13d and the yoke 12.

FIG. 5 (B) illustrates an operating state of the torque limiter 13, in which the N pole of the first permanent magnetic plate 186 is in contact with the first magnetic pole part 182, while the S pole of the second permanent magnetic plate 187 is in contact with the second magnetic pole part 183. At this time, L2 represents the distance between the toggle actuation detection pin 13d and the yoke 12. Since the actuation of the torque limiter 13 shortens the relative distance L2 (L2<L1) between the toggle actuation detection pin 13d and the yoke 181, the first permanent magnetic plate 186 turns in a counterclockwise direction with being in contact with the toggle actuation detection pin 13d, so that the polarity of the first magnetic pole part 182 changes from the S pole to the N pole, and the polarity of the second magnetic pole part 183 changes from the N pole to the S pole. An operator who has felt the actuation of the torque limiter 13 weakens the tightening force of the torque wrench 1, and hence the torque limiter 13 returns to an original state illustrated in FIG. 3 (C). At this time, the toggle actuation detection pin 13d and the yoke 181 relatively move to positions illustrated in FIG. 5 (A). At this time, switching of the polarities, in which the polarities are switched as described above, reverses the direction of an electric current flowing through the induction coil 184, and an electromotive force (+V, −V) is generated by electromagnetic induction. Thereby, the electromagnetic force is fed to the electronic circuit 14.

All the torque wrench 1 of this embodiment has to do is to output the tightening completion signal, when the tightening torque has reached the set torque value. In other words, this embodiment cannot feed the electric power during tightening the member to be tightened, but the electromagnetic induction power generation unit 18 can generate the electric power concurrently with the completion of the tightening, so that no problem arises.

Note that, a motor such as a stepping motor is usable as a power generator instead of the electromagnetic induction power generation unit 18 as the power generation unit.

Third Embodiment

Figure 6:
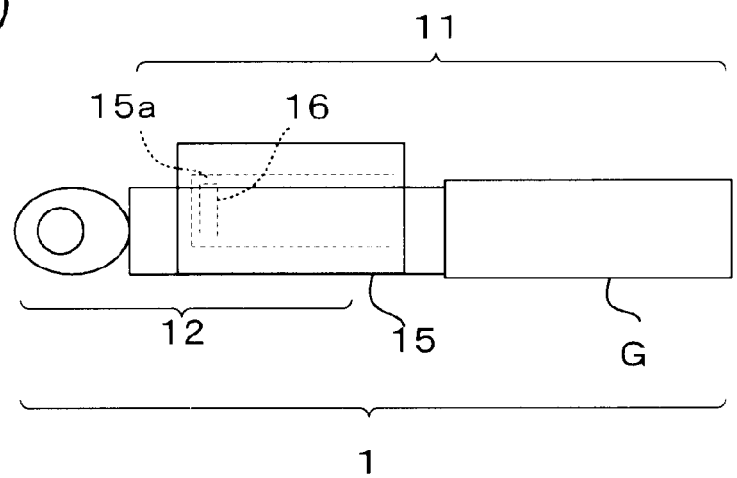
FIG. 6 (A) is a schematic top plan view of a torque wrench illustrating a third embodiment of the present invention, (B) is a front view of (A), and (C) is a schematic view of a torque limiter.
Figure 6:
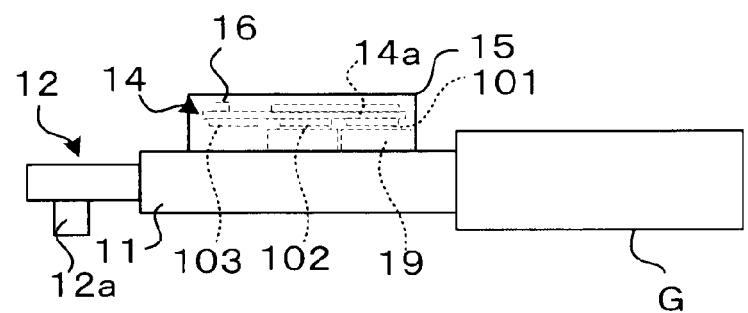
Figure 6:
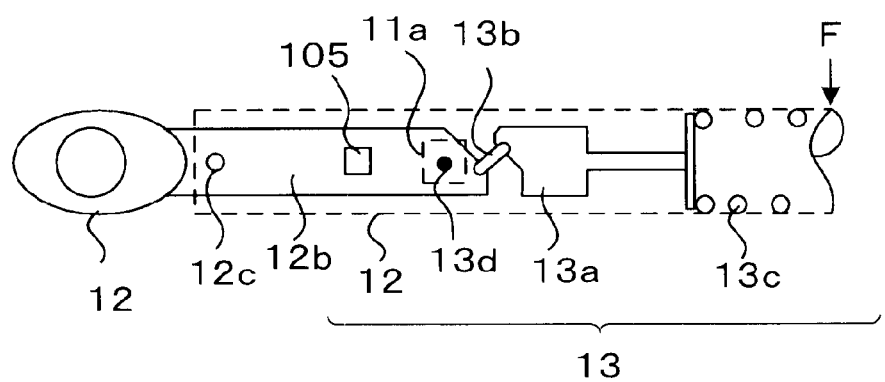

FIGS. 6 (A) to 6 (C) and 7 illustrate a third embodiment.

Figure 7:
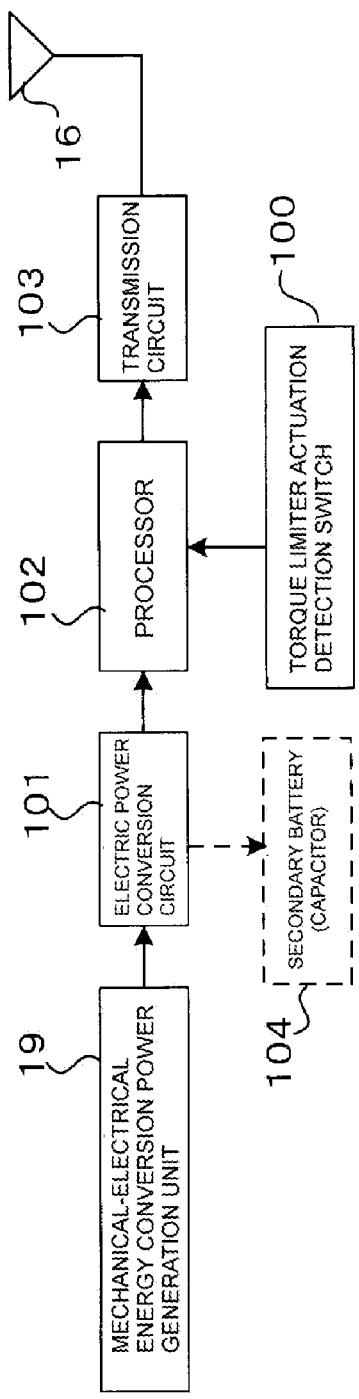
FIG. 7 is a circuit block diagram of a power generation unit and an electronic circuit of the torque wrench illustrated in FIG. 6.

FIGS. 6 (A) to 6 (C) illustrate the third embodiment in which the tightening tool according to the present invention is applied to a torque wrench, and FIG. 6 (A) is a top plan view, FIG. 6 (B) is a front view of FIG. 6 (A), FIG. 6 (C) is a schematic view of a torque limiter. FIG. 7 is a circuit block diagram of the power generation unit and the electronic circuit of the torque wrench illustrated in FIGS. 6 (A) to 6 (C).

The third embodiment is different from the second embodiment in terms of providing as the power generation unit a mechanical-electrical energy conversion power generation unit 19, which converts mechanical energy into electrical energy. Note that, in FIGS. 6 (A) to 6 (C) and FIG. 7, the same reference numerals as those of FIGS. 1 (A) to 1

(C) and 2 are assigned to the same components and the description thereof will be omitted.

The mechanical-electrical energy conversion power generation unit (piezoelectric element) 19 generates the electric power with the use of a piezoelectric element (piezo element) for converting mechanical energy into electrical energy. The piezoelectric element 19 generates an electromotive force when the piezoelectric element is distorted by application of an external force. The piezoelectric element 19 is attached to the circuit board 14*a* fixed to the handle unit 11. The toggle actuation detection pin 13*d* provided to the lever 12*b* and the handle unit 11 relatively move during the actuation of the torque limiter 13.

Thus, as means for applying the external force to the piezoelectric element 19, the toggle actuation detection pin 13*d* is used in this embodiment.

As with the second embodiment, during the actuation of the torque limiter 13, the toggle actuation detection pin 13*d* and the piezoelectric element 19 fixed to the circuit board 14*a* relatively move. In other words, the piezoelectric element 19 fixed to the circuit board 14*a* momentarily collides with the toggle actuation detection pin 13*d* during the actuation of the torque limiter 13. At this time, the piezoelectric element 19 generates an electromotive force, and feeds the electric power to the electronic circuit 14. Thus, the tightening completion signal is outputted in response to the actuation of the torque limiter 13.

Just as with the second embodiment, all the torque wrench of this embodiment has to do is to feed the electric power to the electronic circuit 14 during the actuation of the torque limiter 13 and output the tightening completion signal. Accordingly, the electronic circuit 14 can be driven sufficiently by the electromotive force that is generated in the piezoelectric element 19 by an impact force of one time generated during the actuation of the torque limiter 13, and output the tightening completion signal.

Note that, the piezoelectric element 19 is fixed in the circuit board 14*a*, but the piezoelectric element 19 may be fixed directly in the handle unit 11. The piezoelectric element 19 collides with the toggle actuation detection pin 13*d*, but may directly collide with the lever 13*b* of the head unit 13.

Fourth Embodiment

Figure 8:
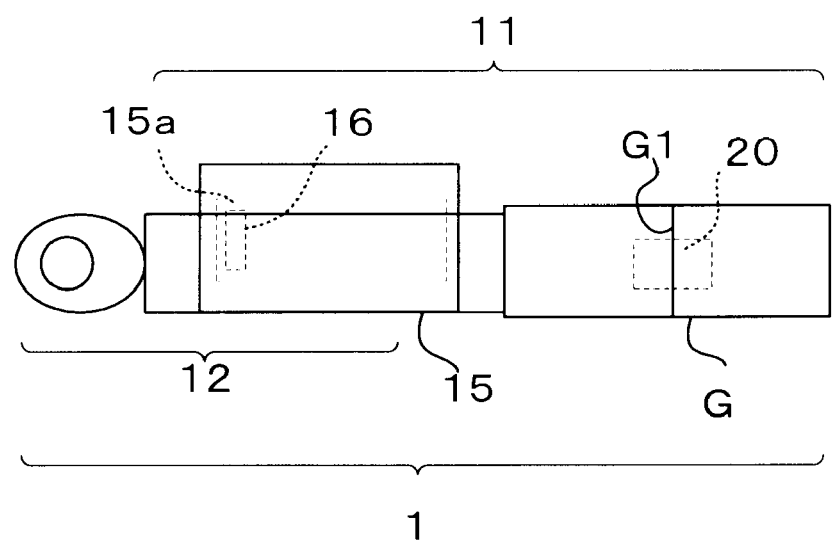
FIG. 8 (A) is a schematic top plan view of a torque wrench illustrating a fourth embodiment of the present invention, and (B) is a front view thereof.
Figure 8:
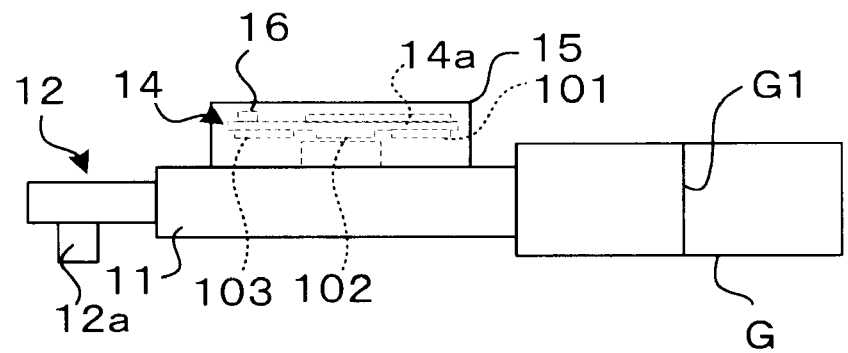
Figure 9:
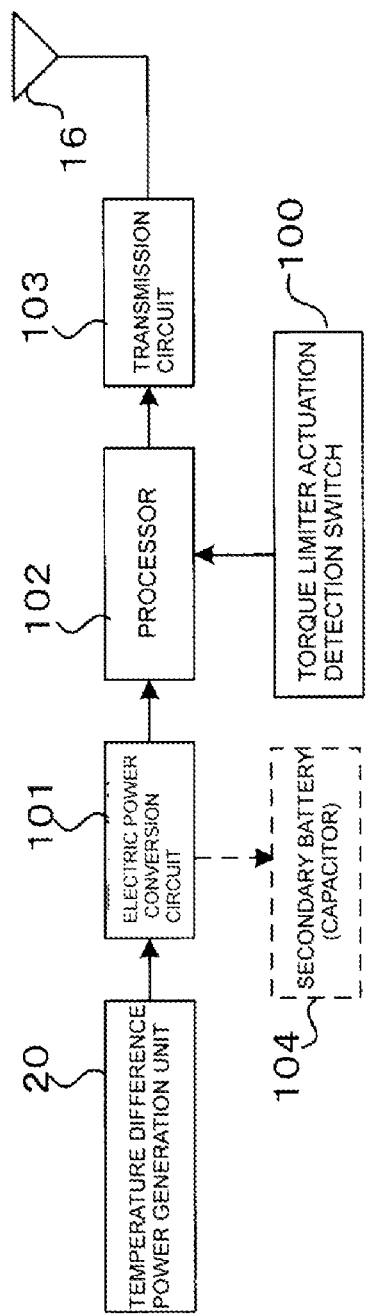
FIG. 9 is a circuit block diagram of a power generation unit and an electronic circuit of the torque wrench illustrated in FIG. 8.

FIGS. 8 (A) and 8 (B) are schematic views of a torque wrench illustrating a fourth embodiment of the present invention, and FIG. 8 (A) is a top plan view and FIG. 8 (B) is a front view. FIG. 9 is a circuit block diagram of a power generation unit and an electronic circuit of the torque wrench illustrated in FIG. 8.

The fourth embodiment is different from the first embodiment in terms of providing a temperature difference power generation unit (Peltier element) 20 as the power generation unit. Note that, in FIGS. 8 (A), 8 (B), and FIG. 9, the same reference numerals as those of FIGS. 1 (A) to 1 (C) and 2 are assigned to the same components and the description thereof will be omitted.

In this embodiment, the temperature difference power generation unit 20 uses a thermoelectric conversion element such as a Peltier element for converting a temperature difference into electrical energy, and the Peltier element 20 is embedded in the grip G of the torque wrench 1. The operator holds the grip G in the tightening operation along a hand line G1. The Peltier element 20 is disposed at least in the position of the hand line G1. When the operator holds the grip G at the hand line G1, a hand of the operator warms a surface of the Peltier element 20, and a temperature difference occurring with an opposite surface that is in contact with the metal handle unit 11 generates an electromotive force. This electromotive force is generated while the operator holds the grip G.

Therefore, during the actuation of the torque limiter 13, the temperature difference power generation unit 20 certainly generates the electromotive force, and operates the electronic circuit 14. Thus, the electronic circuit 14 outputs the tightening completion signal during the actuation of the torque limiter 13.

Each of the above embodiments has such structures that the electronic circuit is driven by using the electric power generated by the power generation unit without providing a power supply battery. Thus, the need for daily maintenance, including a check of a remaining battery level, a battery exchange, and the like, is eliminated. Also, since a contact terminal of the battery and a battery recharger become unnecessary, it is possible to be free from problems of a contact failure, a break of a charging jack, and a break of a charging cable.

Note that, each of the above embodiments describes the torque wrench as an example of the tightening tool, but the present invention is applicable to a torque driver.

Fifth Embodiment

Figure 10:
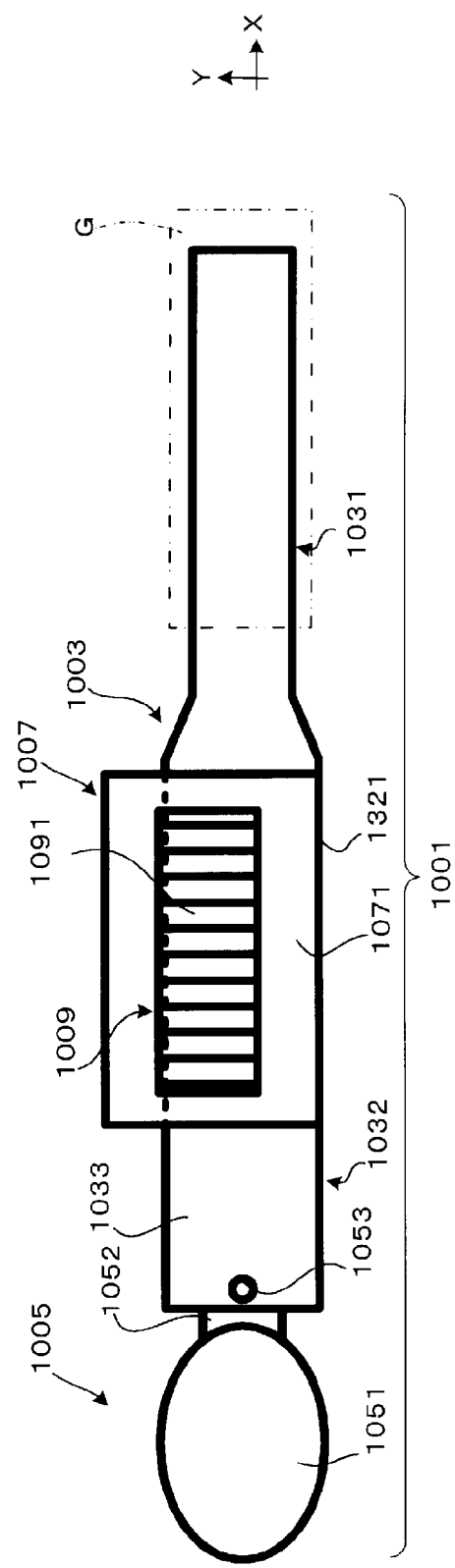
FIG. 10 is a top plan view illustrating a fifth embodiment in which a tightening tool with a solar cell according to the present invention is applied to a torque wrench.
Figure 11:
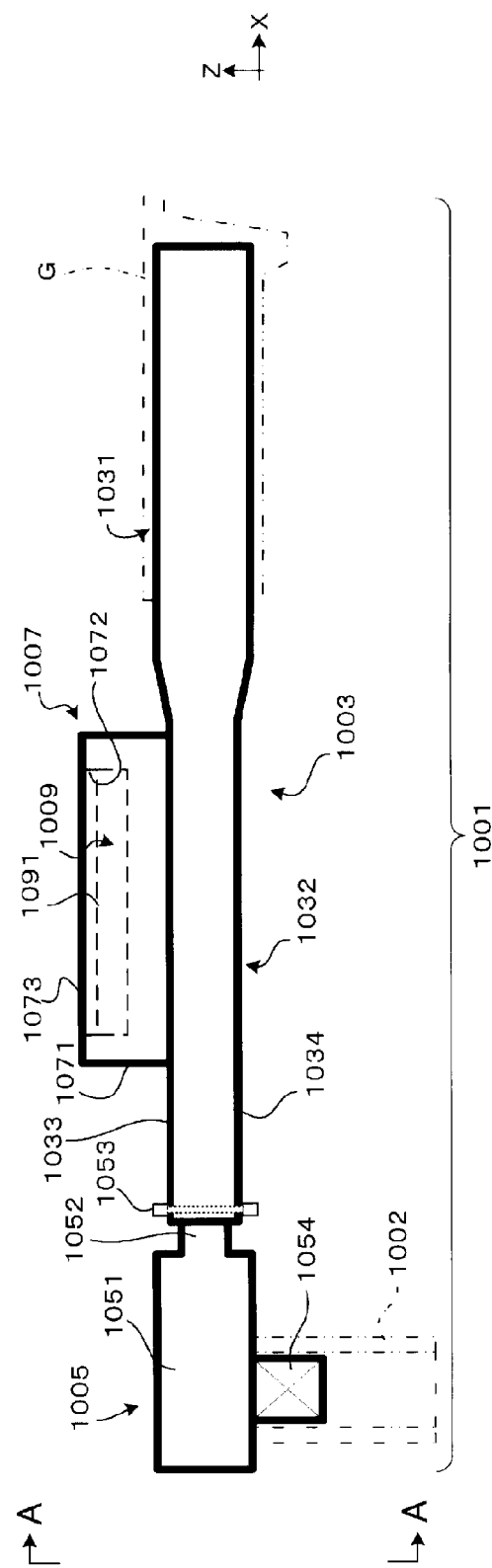
FIG. 11 is a front view of the torque wrench illustrated in FIG. 10.

FIG. 10 is a top plan view illustrating a fifth embodiment in which a tightening tool provided with a solar cell (hereinafter abbreviated as tool with a solar cell) according to the present invention is applied to a torque wrench. FIG. 11 is a front view of the torque wrench illustrated in FIG. 10 and FIG. 12 is a cross-sectional view taken along line AA in FIG. 11.

Figure 12:
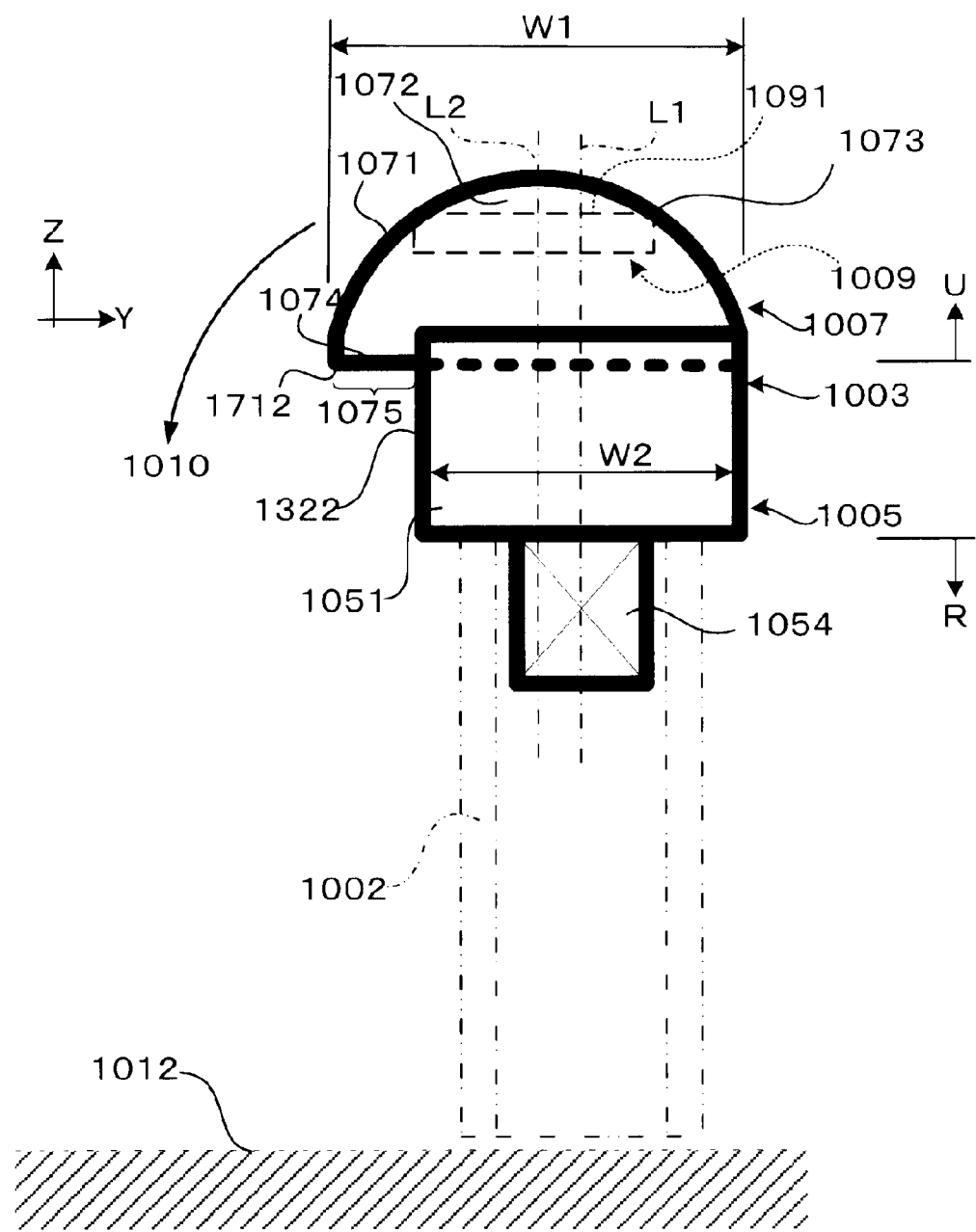
FIG. 12 is a sectional view taken along line A-A in FIG. 11.

In FIGS. 10, 11, and 12, a torque wrench 1001 being the tool with a solar cell has a metal handle 1003, a metal head 1005, a cover 1007, a solar cell 1009, and the like. The handle 1003 contains a not-shown torque limiter composed of, for example, a toggle mechanism.

Note that, in three axes (X axis, Y axis, and Z axis) orthogonal to one another, an X axis refers to a longitudinal direction of the torque wrench 1001, a Y axis refers to a transverse direction thereof, and a Z axis refers to a thickness direction thereof.

The handle 1003 extending in an X axis direction has a cylindrical rear handle portion 1031 and a flat front handle portion 1032 coupled to a front part of the rear handle portion 1031, and is formed in a straight hollow shape as a whole. The grip G is attached to the outer periphery of the rear handle portion 1031.

The front handle portion 1032 of the handle 1003 is formed so as to have a low height in a Z axis direction, relative to a width direction being a Y axis direction. Thus, the handle 1003 is in the most stable position in a state of, for example, being put on a placement surface of a workbench with making a thickness direction of the front handle portion 1032 coincide with a vertical direction. The stable position refers to a state of stopping without wobbling and without being sustained by others, in the state of being put on the placement surface.

The front handle portion 1032 has a flat first outer peripheral portion 1033 and a second outer peripheral portion 1034 that are opposite to each other in the Z axis direction. In this embodiment, an upper surface side (or upward) U refers to the side of the first outer peripheral portion 1033, and a lower surface side (or downward) R refers to the side of the second outer peripheral portion 1034.

The head 1005 has, for example, an elliptical head body portion 1051 and a rear lever portion 1052 extending from the head body portion 1051 rearward in the longitudinal direction. The rear lever portion 1052 of the head 1005 is inserted into the front handle portion 1032 of the handle 1003 through a frontend opening. The head 1005 is turnably supported by a support pin 1053, which penetrates the front handle portion 1032 of the handle 1003 in the Z axis direction. A rear end of the rear lever portion 1052 of the head 1005 constitutes part of the above-described toggle mechanism.

In the head body portion 1051, a square shaft 1054 extending in the Z axis direction is disposed in a turnable manner through a not-shown ratchet mechanism. A socket 1002 is detachably attached to the square shaft 1054. The square shaft 1054 protrudes from the head body portion 1051 to the lower surface side.

When the torque wrench 1001 is composed only of the handle 1003 and the head 1005, the stable position is a first position in which the torque wrench 1001 is put such that the upper surface side U faces the placement surface. Also, the stable position is a second position in which a tip end of the square shaft 1054 or the socket 1002 is in contact with the placement surface, and a side surface of the handle 1003 is in contact with the placement surface and the Z axis is inclined relative to the placement surface.

In the first position, both of the upper surface side U of the handle 1003 and the upper surface side U of the head body portion 1051 are flat surfaces, so that the torque wrench 1 is stably put on the placement surface. In the second position, moment acts on one direction about an axis being a rotation center of the torque wrench 1 in the Z axis direction, so that the torque wrench 1 is stably put on the placement surface.

In this embodiment, the cover 1007 is attached to the first outer peripheral portion 1033 of the front handle portion 1032 with screws or the like.

As shown in FIGS. 10 to 12, the cover 1007 has the solar cell 1009 contained in a plastic cover body 1071 formed in the shape of an approximately semicircular cylinder. The cover 1007 has a function of preventing the torque wrench 1001 from stopping on a placement surface 1012 in such a position that a light receiving surface of the solar cell 1009 faces the placement surface 1012 of the workbench or the like, in addition to the function of protecting the solar cell 1009.

An opening 1072 is formed in the cover 1007 over the solar cell 1009, so that light is incident upon a light receiving surface 1091 of the solar cell 1009 through the opening 1072. The solar cell 1009 may be mounted on, for example, a circuit board (not shown) on which electronic components and the like are mounted, or the solar cell 1009 may be attached to the cover 1007.

A top surface (outer peripheral surface) 1073 of the cover body 1071 is formed into an arc-shaped roof, and the cover 1007 is formed in a so-called barrel roof shape extending in the X axis direction. When W1 refers to a length of a bottom surface 1074 of the cover 1007 in a width direction (Y axis direction) and W2 refers to a length of the width (length in the Y axis direction) of the front handle portion 1032 to which the cover 1007 is attached, W1>W2 holds true.

In this embodiment, the cover 1007 is disposed so as to make one end 1711 of the cover body 1071 coincide with one end 1321 of the front handle portion 1032 in the width direction. Thus, the other end 1712 of the cover body 1071 in the width direction protrudes outward in the Y axis direction, relative to the other end 1322 of the front handle portion 1032 in the width direction. In other words, the cover body 1071 has a protruding portion 1074 that protrudes from the front handle portion 1032 in the width direction.

In this embodiment, a center line L1 of the torque wrench 1001 (excluding the cover 1007) in the Y axis direction is a center line passing through the axial center of the square shaft 1054. On the other hand, a center line L2 of the cover 1007 in the Y axis direction exists in the position of half of the length W1 of the cover body 1071 in the width direction.

Thus, the center line L1 of the torque wrench 1001 excluding the cover 1007 in the Y axis direction and the center line L2 of the cover 1007 in the Y axis direction are in different positions in the Y axis direction, and misaligned by a distance of (W1-W2)/2 (this misalignment is hereinafter referred to as axial center misalignment).

In the above embodiment, as illustrated in FIG. 12, when the torque wrench 1 is put on the placement surface 1012 such that the cover 1007 faces upward, the light from above is incident upon the solar cell 1009 in the cover 1007 through the opening 1072. A placement position (hereinafter called third position) of the torque wrench 1001 illustrated in FIG. 10 is unstable because the torque wrench 1001 has a high center of gravity, and the square shaft 1054 or the socket attached to the square shaft 1054 is in contact with the placement surface 1012 in a slight contact area. Moreover, the effect of the above-described axial center misalignment causes further unstableness. In this case, the torque wrench 1001 cannot keep the second position, and topples in an arrow 1010 of FIG. 12.

When the torque wrench 1001 topples in the direction of the arrow 1010, the other end 1712 of the cover 1007 in the width direction comes into contact with the placement surface 1012 and stops. In this stop state, the entire torque wrench 1001 topples laterally, but since the opening 1072 of the cover 1007 is lateral, the light is directly or reflectively incident upon the light receiving surface 1091 of the solar cell 1009 through the opening 1072. This stop position is referred to as a fourth position. The torque wrench 1001 in the fourth position is lateral as a whole and low in position, so that the fourth position is maintained stably.

Next, a case in which the torque wrench 1001 is put upside down on the placement surface 1012 will be described with reference to FIG. 13.

Figure 13:
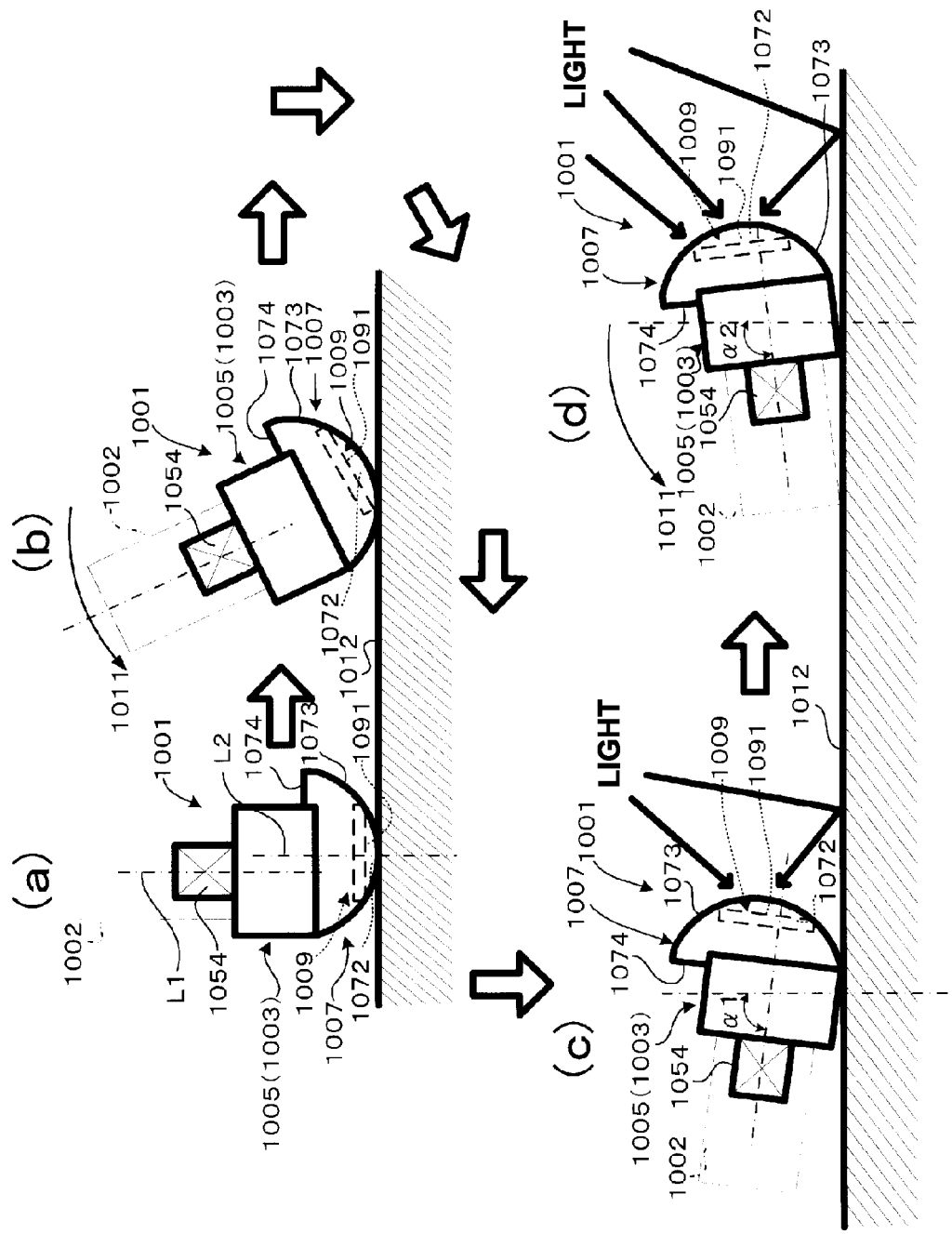
FIG. 13 is a drawing that explains a turn operation of the torque wrench to face a light receiving surface of the solar cell to a predetermined direction.

In FIG. 13 (*a*), when the torque wrench 1001 is put upside down on the placement surface 1012, the opening 1072 of the cover 1007 is in contact with the placement surface 1012, and hence no light reaches the light receiving surface of the solar cell 1009 through the opening 1072. Thus, the solar cell 1009 cannot generate the electric power.

The position (called fifth position) of the torque wrench 1 illustrated in FIG. 13 (*a*) cannot be maintained unless a user of the torque wrench 1001 supports the torque wrench 1001 with a hand, because the outer peripheral surface 1073 of the cover body 1071, which is formed in an arc shape as a whole, is in contact with the placement surface 1012.

When the user of the torque wrench 1001 moves his/her hand off the torque wrench 1001 in the fifth position, as illustrated in FIG. 13 (*b*), the torque wrench 1001 topples in the direction of the arrow 1011. In the fifth position of FIG. 13 (*a*), the torque wrench 1001 has a high center of gravity and is in an unstable position, because the handle 1003 and the head 1005 are present over the cover 1007. Also, due to the axial center misalignment, being the positional misalignment between the center line L1 and the axial center L2, the torque wrench 1001 is inclined to the side of the center line L1 and then topples.

The torque wrench 1001 that has been in the unstable position as illustrated in FIG. 13 (*b*) and starts inclining by itself to a stable position topples to a lateral sixth position, as illustrated in FIG. 13 (c). The sixth position refers to a state in which the torque wrench 1001 topples from the fifth position illustrated in FIG. 13 (a) by a turn angle α1 of less than 90 degrees. In the case of the small axial center misalignment, small rotational moment, or the like, the torque wrench 1001 is inclined laterally, but the turn angle may not exceed 90 degrees. In this case, the torque wrench 1001 stops in such a state that the end of the top surface 1073 of the cover body 1071 is in contact with the placement surface 1012. Since the top surface 1073 of the cover body 1071 is in the arc shape, the stop state in the sixth position may possibly be unstable and swing, but the lateral position is maintained in a stable manner. Therefore, the light is directly incident upon the light receiving surface 1091 of the solar cell 1009 through the opening 1072 of the cover body 1071, or light reflected by the placement surface 1012 is incident thereon. Accordingly, the solar cell 1009 generates electric power.

FIG. 13 (d) illustrates a state in which torque wrench 1001 is further turned beyond the sixth position of FIG. 13 (c), and a turn angle α2 exceeds 90 degrees. In the case of the large axial center misalignment, large rotational moment, or the like, the turn angle by which the torque wrench 1001 is inclined laterally may exceed 90 degrees. In this case, the torque wrench 1001 stops in such a state that an edge of the head body portion 1051, one end of the handle 1003 in the width direction, and the tip end of the square shaft 1054 or the tip end of the socket 1002 are in contact with the placement surface 1012. This state is referred to as a seventh position.

In the seventh position, the rotational moment of the torque wrench 1001 toppling laterally is applied in the direction of the arrow 1011. Thus, the stop state in the seventh position is extremely stable, and the lateral position is maintained in a stable manner. The opening 1072 of the cover body 1071 faces upward obliquely in the seventh position, and hence faces toward, for example, a ceiling light in a plant, as compared with the sixth position.

Accordingly, more direct light from the ceiling light and the like is incident upon the light receiving surface 1091 of the solar cell 1009 through the opening 1072 of the cover body 1071, or more light reflected by the placement surface 1012 is incident thereon. Thereby, the solar cell 1009 generates the electric power.

As described above, according to the fifth embodiment, since the outer peripheral surface of the cover 1007 containing the solar cell 1009 is formed in the arc shape, if the torque wrench 1001 is put on the workbench such that the cover 1007 faces down to the placement surface 1012, the torque wrench 1001 topples laterally and stops. Therefore, the light is incident upon the light receiving surface of the solar cell 1009 and the electric power generated thereby is charged into a storage battery, for example.

Sixth Embodiment

Figure 14:
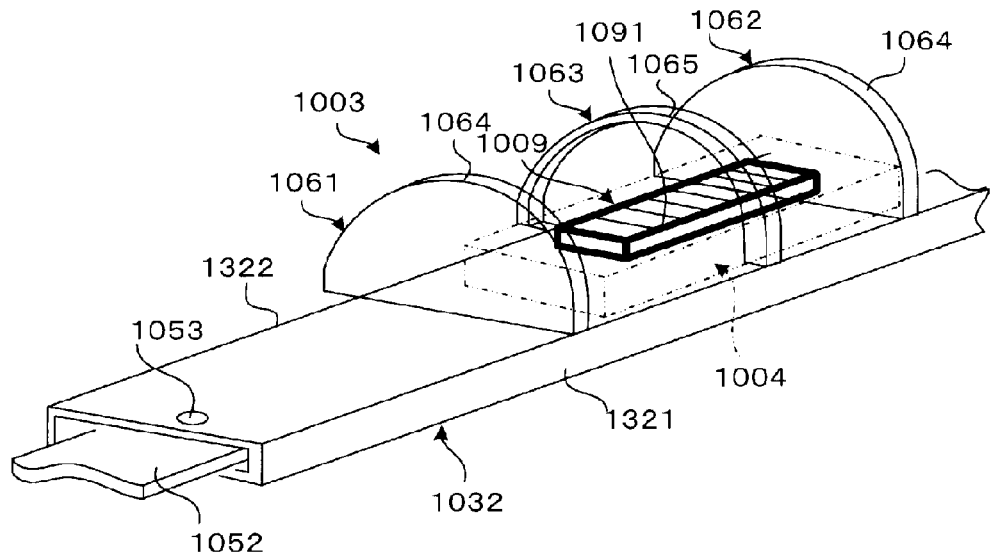
FIG. 14 is a perspective view illustrating an essential part of a sixth embodiment.

FIG. 14 illustrates a sixth embodiment of the present invention.

The sixth embodiment shows a case in which the solar cell 1009 is incorporated in, for example, a circuit case 1004 that contains the circuit board for mounting the electronic circuit thereon, the storage battery, and the like. In this case, the circuit case 1004 protects the solar cell 1009.

In the sixth embodiment, the circuit case 1004 is attached to the upper surface side U of the front handle portion 1032. A first stop inhibiting plate 1061 and a second inhibiting plate 1062 are attached on the upper surface side U of the front handle portion 1032 in front and rear of the circuit case 1004 in the X axis direction. Note that, the first stop inhibiting plate 1061 and the second inhibiting plate 1062 may be attached to a front end and a rear end of the circuit case 1004 in the X axis direction. Also, a stop inhibiting frame 1063 is attached on the upper surface side U of the front handle portion 1032 between the first stop inhibiting plate 1061 and the second inhibiting plate 1062. The stop inhibiting frame 1063 may be attached to a side surface of the circuit case 1004.

The first stop inhibiting plate 1061 and the second stop inhibiting plate 1062 are formed higher than the circuit case 1004. Top ends 1064 of the first stop inhibiting plate 1061 and the second stop inhibiting plate 1062 are formed into an arc shape. The stop inhibiting frame 1063 is formed into a frame structure with an external shape similar to the first stop inhibiting plate 1061 and the second stop inhibiting plate 1062. Thus, a top end 1065 of the stop inhibiting frame 1063 is formed into an arc shape.

The first stop inhibiting plate 1061, the second inhibiting plate 1062, and the stop inhibiting frame 1063 are disposed so as to align one ends thereof with the one end 1321 of the front handle portion 1032. The other ends of the first stop inhibiting plate 1061, the second inhibiting plate 1062, and the stop inhibiting frame 1063 protrude outward from the other end 1322 of the front handle portion 1032 in the Y axis direction.

In this embodiment, the top ends 1064 of the first stop inhibiting plate 1061 and the second inhibiting plate 1062 and the top end 1065 of the stop inhibiting frame 1063 have the same action as the top surface 1073 of the cover body 1071, formed into the arc-shaped roof, in the cover 1007 according to the fifth embodiment.

More specifically, when the torque wrench 1001 is put such that the light receiving surface of the solar cell 1009 faces the placement surface 1012, the torque wrench 1001 turns laterally and stops due to imbalance of the torque wrench 1001 in the width direction, as explained in FIG. 13, because each of the top ends 1064 of the first stop inhibiting plate 1061 and the second inhibiting plate 1062 and the top end 1065 of the stop inhibiting frame 1063, which are in contact with the placement surface 1012, is in the arc shape.

In the sixth embodiment, since the first stop inhibiting plate 1061, the second inhibiting plate 1062, and the stop inhibiting frame 1063 are disposed at a distance, even if the solar cell 1009 is in a lateral position, more light is incident upon the light receiving surface of the solar cell 1009.

Note that, the stop inhibiting frame 1063 may be substituted for the first stop inhibiting plate 1061 and the second stop inhibiting plate 1062. The first stop inhibiting plate 1061 and the second stop inhibiting plate 1062 are eliminated, and only the stop inhibiting frame 1063 may be provided. Moreover, the stop inhibiting frame 1063 is eliminated, and only the first stop inhibiting plate 1061 and the second stop inhibiting plate 1062 may be provided.

In the fifth embodiment and the sixth embodiment described above, if the torque wrench 1001 is put on the workbench without concern for the direction of the solar cell 1009, the torque wrench 1001 stops in such a position that the light receiving surface of the solar cell 1009 faces lateral. Therefore, the solar cell 1009 generates electric power while the torque wrench 1001 is put on the workbench or the like and unused. Thereby, the storage battery can be charged.

Seventh Embodiment

Figure 15:
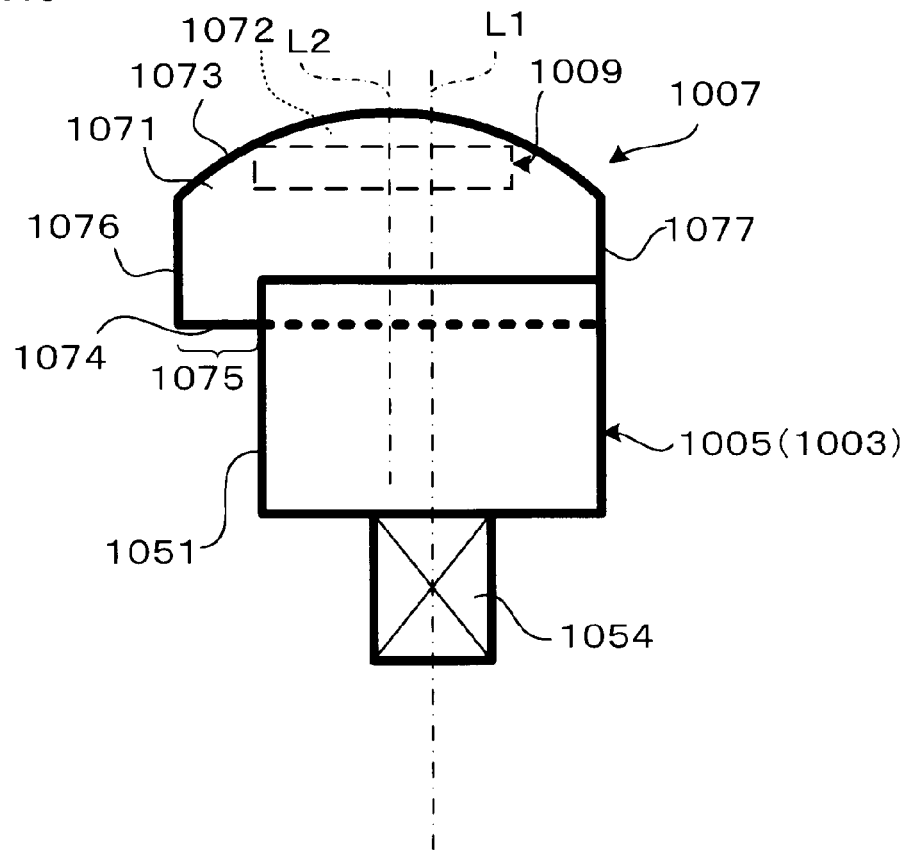
FIG. 15 is a side view illustrating an essential part of a seventh embodiment.

FIG. 15 illustrates a seventh embodiment.

The seventh embodiment shows a modified example of the fifth embodiment. In this embodiment, sidewalls 1076 and 1077 are provided vertically upward from both ends of the bottom surface 1074 of the cover 1007 in the width direction, and the top surface 1073 that constitutes the arc-shaped roof is provided across top ends of the side walls 1076 and 1077, while in the cover 1007 illustrated in FIG. 12, both ends of an arc that forms the top surface 1073 reach the bottom surface 1074.

According to the cover 1007 of this embodiment, the side wall 1076 or 1077 is situated on the placement surface of the workbench together with the side surface of the head 1005 and the side surface of the lever 1003, so that it is possible to maintain the lateral position of the torque wrench 1001 in a stable manner.

REFERENCE SIGNS LIST

1 torque wrench
11 handle unit (first member)
12 head unit (second member)
13 torque limiter
14 electronic circuit
15 circuit board case
16 communication antenna
17 photovoltaic power generation unit
18 electromagnetic induction power generation unit
19 mechanical-electrical energy conversion power generation unit
20 temperature difference power generation unit
100 torque limiter actuation detection switch
101 electric power converter
102 processor
103 communication unit
104 electric storage unit
105 distortion gage
1001 torque wrench
1002 socket
1003 handle
    1031 rear handle portion, 1032 front handle portion
    1033 first outer peripheral portion, 1034 second outer peripheral portion
    1321 one end, 1322 other end
    U upper surface side, R lower surface side, G grip
1004 circuit case
1005 head
    1051 head body portion, 1052 rear lever portion
    1053 support pin, 1054 square shaft
1007 cover
    1071 cover body, 1072 opening, 1073 top surface
    1074 bottom surface, 1075 protruding portion
    1076, 1077 side wall
    1711 one end, 1722 other end
1009 solar cell
    1091 light receiving surface
1010, 1011 arrow, 1012 placement surface
1061 first inhibiting plate, 1062 second inhibiting plate, 1063 stop inhibiting frame
1064, 1065 top end
L1, L2 center line
α1, α2 turn angle

The invention claimed is:

1. A tightening tool wherein when a tightening torque has reached a set torque value and a torque limiter is actuated, an electronic circuit unit that has obtained a detection signal outputted from a torque limiter actuation detection unit outputs a tightening completion signal, the tightening tool comprising:
    a power generation unit that feeds electric power to the electronic circuit unit at least during the actuation of the torque limiter; and
    an electric storage unit that accumulates surplus electricity generated in the power generation unit.

2. The tightening tool according to claim 1, wherein the power generation unit is a photoelectric conversion element that converts light energy into electrical energy.

3. A tightening tool wherein when a tightening torque has reached a set torque value and a torque limiter is actuated, an electronic circuit unit that has obtained a detection signal outputted from a torque limiter actuation detection unit outputs a tightening completion signal, the tightening tool comprising
    a power generation unit that feeds electric power to the electronic circuit unit at least during the actuation of the torque limiter,
    wherein the power generation unit is of an electromagnetic induction type in which switching magnetic poles of the N pole and the S pole to be applied to a pair of poles of a yoke by pole switching means generates an electromotive force from an induction coil wound on the yoke, and the switching of the pole switching means is driven with the use of a mechanical operation during the actuation of the torque limiter.

4. The tightening tool according to claim 3, wherein the mechanical operation during the actuation of the torque limiter is an operation between a moving operation of a first member on which an operator takes a grip along a tightening direction and a second member integrally connected to a member to be tightened.

5. A tightening tool wherein when a tightening torque has reached a set torque value and a torque limiter is actuated, an electronic circuit unit that has obtained a detection signal outputted from a torque limiter actuation detection unit outputs a tightening completion signal, the tightening tool comprising
    a power generation unit that feeds electric power to the electronic circuit unit at least during the actuation of the torque limiter,
    wherein the power generation unit is a mechanical-electrical energy conversion element that converts mechanical energy into electrical energy, and an impact is applied to the mechanical-electrical energy conversion element with the use of a mechanical operation during the actuation of the torque limiter.

6. The tightening tool according to claim 5, further comprising an electric storage unit that accumulates surplus electricity generated in the power generation unit.

7. A tightening tool wherein when a tightening torque has reached a set torque value and a torque limiter is actuated, an electronic circuit unit that has obtained a detection signal outputted from a torque limiter actuation detection unit outputs a tightening completion signal, the tightening tool comprising
    a power generation unit that feeds electric power to the electronic circuit unit at least during the actuation of the torque limiter,
    wherein the power generation unit is a thermoelectric conversion element that converts a temperature difference into electrical energy, provided in a grip portion on which an operator takes a grip in a tightening operation.

8. A tightening tool comprising:
a solar cell disposed on a surface of the tool; and
a cover that extends in a longitudinal direction of a body of the tool and covers the solar cell in which a transverse direction orthogonal to the longitudinal direction is designated as a width direction, wherein the cover is formed into a convex arc-shaped roof such that a top surface on the side of a light receiving surface of the solar cell faces outward, and has oblique surfaces at respective ends in the width direction.

9. The tightening tool according to claim 8, wherein a center line of the cover in the width direction and a center line of the tool are misaligned in the width direction.

10. The tightening tool according to claim 8, wherein the solar cell protrudes outward from one end in the width direction, relative to a tool disposition portion in which the solar cell is disposed.

11. The tightening tool according to claim 8, wherein the tool is a torque wrench, and the solar cell is disposed in an opposite side to a direction in which a square shaft provided in a head protrudes.

12. A tightening tool comprising:
a solar cell disposed on a surface of the tool; and
stop inhibiting members that extend in a longitudinal direction of a body of the tool and are disposed at respective ends of the solar cell in the longitudinal direction, in which a transverse direction orthogonal to the longitudinal direction is designated as a width direction, and protrudes upward from a light receiving surface of the solar cell, wherein
the stop inhibiting member is formed into a convex arc shape such that a top end on the side of the light receiving surface of the solar cell faces outward, and has oblique surfaces at respective ends in the width direction.

13. The tightening tool according to claim 12, wherein a center line of the stop inhibiting member in the width direction and a center line of the tool are misaligned in the width direction.

14. The tightening tool according to claim 12, wherein the solar cell protrudes outward from one end in the width direction, relative to a tool disposition portion in which the solar cell is disposed.

15. The tightening tool according to claim 12, wherein the tool is a torque wrench, and the solar cell is disposed in an opposite side to a direction in which a square shaft provided in a head protrudes.

16. A tightening tool comprising:
a solar cell disposed on a surface of the tool; and
a stop inhibiting member that extends in a longitudinal direction of a body of the tool and is disposed astride the solar cell, in which a transverse direction orthogonal to the longitudinal direction is designated as a width direction, and protrudes upward from a light receiving surface of the solar cell, wherein
the stop inhibiting member is formed into a convex arc shape such that a top end on the side of the light receiving surface of the solar cell faces outward, and has oblique surfaces at respective ends in the width direction.

17. The tightening tool according to claim 16, wherein a center line of the stop inhibiting member in the width direction and a center line of the tool are misaligned in the width direction.

18. The tightening tool according to claim 16, wherein the solar cell protrudes outward from one end in the width direction, relative to a tool disposition portion in which the solar cell is disposed.

19. The tightening tool according to claim 16, wherein the tool is a torque wrench, and the solar cell is disposed in an opposite side to a direction in which a square shaft provided in a head protrudes.

* * * * *